United States Patent [19]

Dinnage et al.

[11] Patent Number: 4,561,941
[45] Date of Patent: Dec. 31, 1985

[54] ESSENCE RECOVERY PROCESS

[75] Inventors: Derek F. Dinnage; George F. Worrall, both of Tonawanda, N.Y.

[73] Assignee: APV Equipment, Incorporated, Tonawanda, N.Y.

[21] Appl. No.: 444,783

[22] Filed: Nov. 26, 1982

[51] Int. Cl.⁴ ............................ B01D 1/26; B01D 3/02
[52] U.S. Cl. ..................................... 203/24; 159/24 B; 159/24.3; 203/26; 426/387
[58] Field of Search .................. 159/24 B; 203/24, 26; 426/386, 387

[56] References Cited
U.S. PATENT DOCUMENTS

| | | | |
|---|---|---|---|
| 627,028 | 6/1899 | Viele | 254/23 |
| 2,076,597 | 4/1937 | Robinson et al. | 159/24 B |
| 2,423,747 | 7/1947 | Zahm | 99/205 |
| 2,450,774 | 10/1948 | Zahm | 99/205 |
| 2,457,315 | 12/1948 | Milleville | 99/205 |
| 2,536,994 | 1/1951 | Cremaschi | 99/35 |
| 2,764,233 | 9/1956 | Skinner | 159/24 B |
| 2,895,546 | 8/1955 | Sadtler | 159/24 |
| 3,290,153 | 12/1966 | Bayne et al. | 159/24 B |
| 3,645,756 | 2/1972 | Huth | 99/140 R |
| 4,309,254 | 1/1982 | Dahlstrom et al. | 203/47 |

OTHER PUBLICATIONS

APV Essence Recovery Units Publication A479b Printed In England 3/80/30 RC.
DFI News For The Dairy/Food Industry-Volume 5, No. 4.
An Improved Experimental Unit For Recovery Of Volatile Flavors ARS 73-19 Feb. 1958.

Primary Examiner—Frank Sever
Attorney, Agent, or Firm—Christel, Bean & Linihan

[57] ABSTRACT

A highly efficient essence recovery process associated with a continuous process which utilizes mechanical vapor recompression for concentrating fruit juices. In one embodiment of this invention the essence is extracted from a juice by introducing feed juice to an evaporator and heating the feed juice within the evaporator sufficiently to boil off essence bearing vapor, by mechanically compressing the essence bearing vapor, the compression raising the condensing temperature of the essence bearing vapor, utilizing the compressed and heated essence bearing vapor to evaporates the feed juice within the evaporator, a substantial portion of the compressed and heated vapor condensing out as it evaporates the feed juice, and collecting the excess vapor as the essence with or without further concentration. By utilizing the method outlined above, it is possible to use the excess heat of the mechanical vapor recompression system to produce an outflow of essence enriched vapors.

6 Claims, 4 Drawing Figures

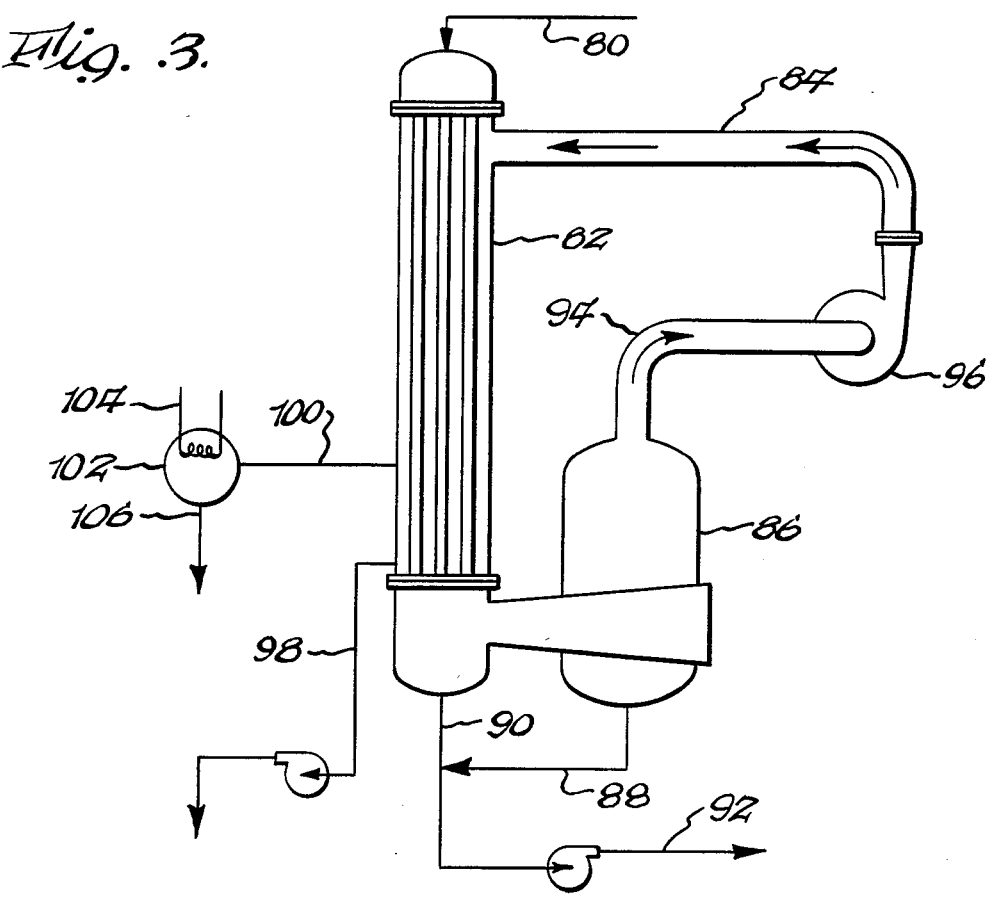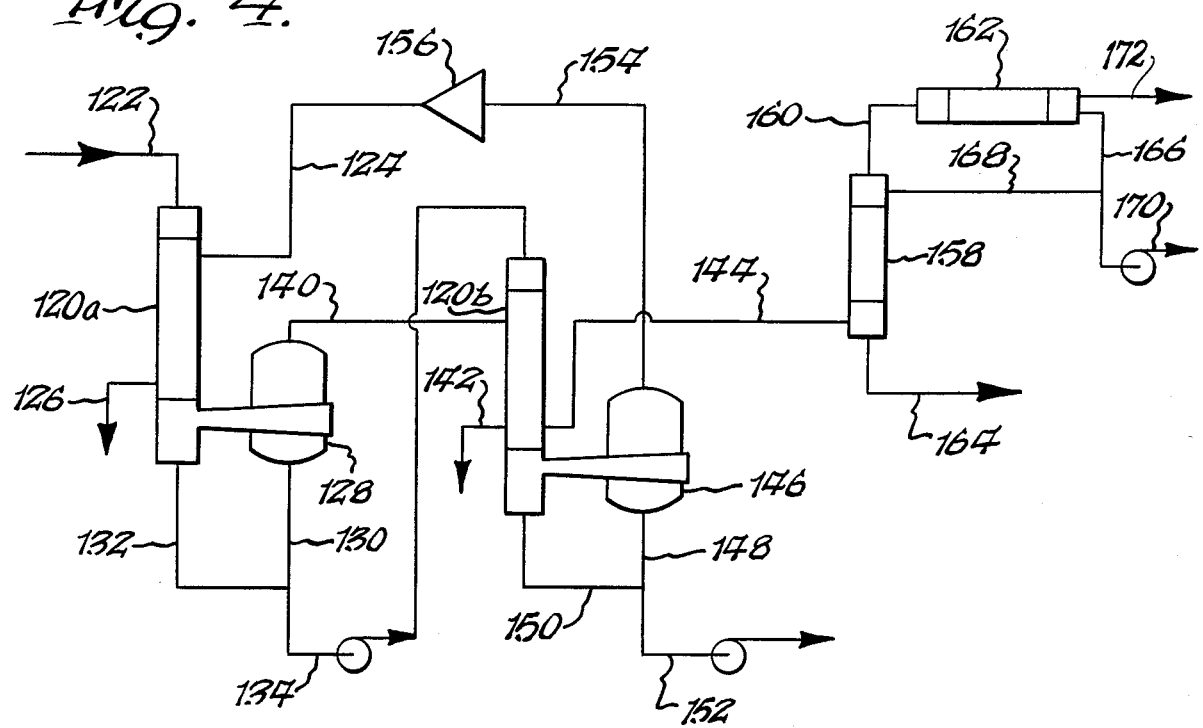

ESSENCE RECOVERY PROCESS

BRIEF SUMMARY OF THE INVENTION

The present invention relates generally to a method for extracting essences from juices.

One object of the present invention is to provide a high efficiency system in combination with a continuous process which utilizes mechanical vapor recompression for concentrating fruit juices.

In one embodiment of this invention the essence is extracted from a juice by introducing feed juice to an evaporator and heating the feed juice within the evaporator sufficiently to boil off essence bearing vapor, by mechanically compressing the essence bearing vapor, the compression raising the condensing temperature of the essence bearing vapor, utilizing the compressed and heated essence bearing vapor to evaporate the feed juice within the evaporator, a substantial portion of the compressed and heated vapor condensing out as it evaporates the feed juice, and collecting the excess vapor as the essence with or without further concentration. By utilizing the method outlined above, it is possible to use the excess heat of the mechanical vapor recompression system to produce an outflow of essence enriched vapors.

The foregoing will be described in greater detail below with reference to the accompanying drawings in which prior art and preferred forms of this invention are illustrated.

BRIEF DESCRIPTION OF THE DRAWINGS

FIG. 3 shows schematically one embodiment of the essence recovery process of this invention wherein mechanical vapor recompression is utilized with a single effect evaporator.

FIG. 4 illustrates a second embodiment of the essence recovery process of this invention, wherein mechanical vapor recompression is utilized with a system having a two effect evaporator.

DETAILED DESCRIPTION

Most fruit juices owe their aroma and much of their flavor to organic compounds known generally as essences. When fruit juice is concentrated by evaporation in order to facilitate storage, handling and transport, many of the volatile components are removed. Thus, the essence of a juice, such as apple juice or orange juice, is that portion of the juice which boils over with water vapor, and which can be subsequently concentrated, for example, 150 fold. (150 fold would equal 1 gallon of essence for 150 gallons of initial feed juice). The essence may be used to recombine with the concentrated juice to rebuild its flavor, or the essence may be used in other applications, as for example in flavor concentrates, or in the cosmetic industry. Because juices vary, different quantities of juice must be initially boiled off to effectively "strip"the essences. Thus, for example, with apple juice a "strip" of 10% is sufficient to remove the majority of essences during the early stages of evaporation. However, with Concord grape juice a 30% "strip" is required. In the past the stripped essence bearing vapor has been subsequently concentrated by various practices (which will be described below) to obtain the desired fold concentration.

Essence recovery got started in the United States, in the juice industry, in the 1940's with the U.S.D.A. approach. The feed juice was initially placed in a stripping evaporator of the single effect type, the feed juice being boiled to evaporate approximately 10% of the feed juice. This portion contained not only the volatile organic essences, but also evolved water vapor. The essence bearing vapors were subsequently passed into a packed column or distillation column. At the lower end of the column, bottoms were extracted, and at the upper end essences were carried over to a condenser in which vapors were condensed, a portion of them being used as a flux, and the other portion being collected as the essence. It should be noted that in this design much of the energy utilized in the stripping evaporator was subsequently lost, making this design relatively energy inefficient. This form of essence recovery has been referred to as "distillation of the vapor". The balance of the feed juice, which was not initially boiled off could then be concentrated further if desired.

Figure 1:
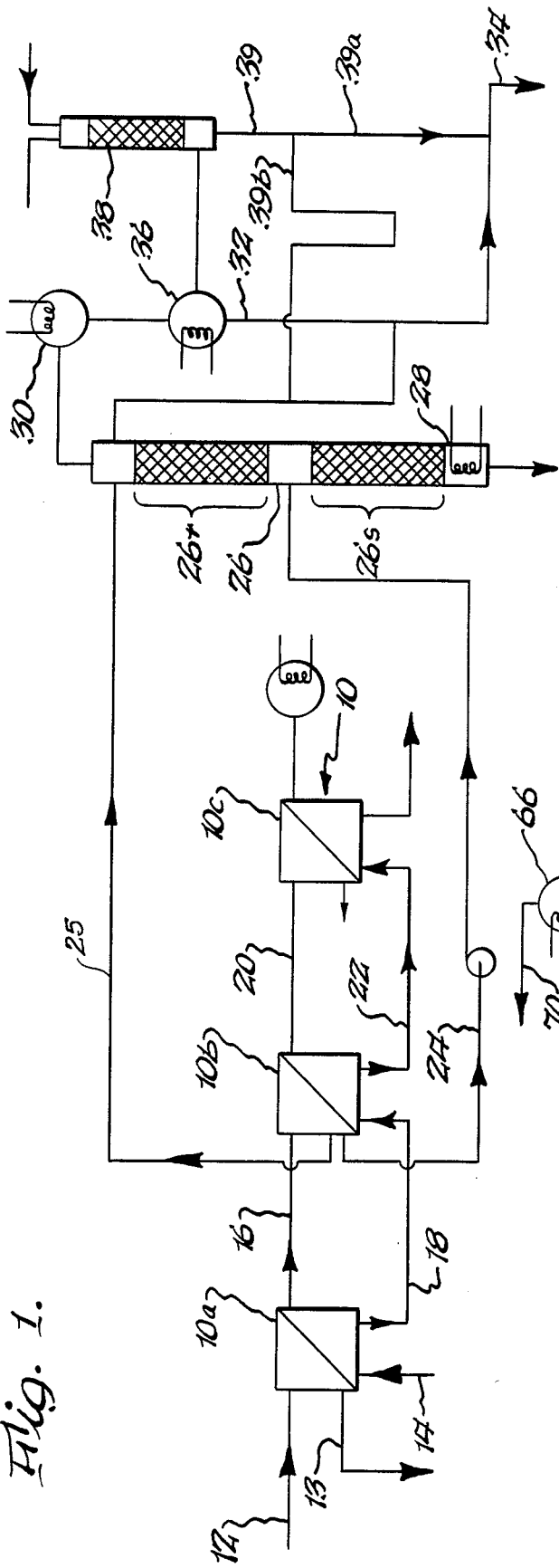
FIG. 1 is a somewhat schematic illustration of a prior art essence recovery system in which condensed vapor is further distilled.

In the 1950's a new process was introduced which involves distillation of a condensed vapor. This process was subsequently utilized with a multiple effect evaporator in the 1960's and is illustrated in FIG. 1. In this figure the multiple effect evaporator is indicated generally at 10, and includes first, second, and third effects indicated at 10a, 10b, and 10c, respectively. In the first effect 10a steam 12 is introduced to the vapor side of the first effect heating plates, the steam condensing and passing out as it gives up its heat, the discharged steam or condensate being indicated at 13. A feed juice 14 is introduced to the feed side or the boiling side of the first effect plates or tubes and a portion of the feed juice is boiled away to produce as essence bearing vapor 16 and a first concentrate 18. Both the essence bearing vapor 16 and concentrate 18 are discharged from the first effect 10a and are introduced to the second effect 10b, the essence bearing vapor being introduced to the vapor side of the plates, and the concentrate 18 being introduced to the boiling side of the plates. The essence bearing vapor 16 is used to heat the concentrate 18 to boil off a further portion, the boiled off portion of the 1st concentrate being indicated at 20, and the second concentrate being indicated at 22. As the first concentrate is heated the essence bearing vapor will condense, the condensate 24 flowing out of the system is indicated at 20. Vapors, such as air and other portions of the essence bearing vapor which will not condense out within the second effect 10b, are vented, the vent vapor being indicated at 25. The boiled off portion or vapor 20 will be discharged from the second effect 10b and introduced to the vapor side of a third effect 10c, while the second concentrate 22 also will be discharged from the second effect 10b and will be introduced to the feed side of the third effect 10c for further concentration. While three effects have been illustrated in FIG. 1, it should be apparent that two, four, or more effects could be utilized. As is well known in the art, multiple effect evaporators are utilized to give a higher overall steam efficiency than is possible with a single effect evaporator.

The essence is contained in the condensate 24 and vent vapor 25. In the distillation of the condensed vapor process, illustrated in FIG. 1 the condensate 24 and vent vapor 25 are sent into a distillation column 26 having a reboiler 28 at its base and an essence condenser 30 at the top.

The liquid feed (condensate) passes down through the "stripping" section 26s of the column and the volatile components are stripped and flow upwards with the upflow of steam generated by the reboiler.

Above the liquid feed point enriching of the vapor occurs in the "rectification" section 26r.

The fully enriched vapor is condensed in the condenser 30 to form condensate 32. Some of the condensate 32 is refluxed down the column, while a portion is bled off as essence 34.

Noncondensed vapors are cooled in cooler 36 and scrubbed in scrubber 38 prior to exit from the system with either chilled water or chilled essence. A portion 39a of the scrubber water (or essence) is being used as a part of the total essence, the remainder 39b being replaced.

While the "distillation of the condensate" process is more efficient than the "distillation of the vapor" process, it should still be noted that virtually all of the essence bearing vapor is first fully condensed and is then passed out of the system entirely, and that it is then necessary to provide a column 26 with reboiler 28 to strip the condensate 24 and rectify it up to the desired essence fold.

The distillation of the vapor process, as well as the distillation of the condensed vapor process, while both generally satisfactory for non-citrus fruits, are not satisfactory for citrus fruits. Thus, it was subsequently recognized (at the Lake Alfred Citrus Research and Education Station) that the high temperature utilized in the systems referred to above adversely affected the quality of the essence recovered from citrus juices. Citrus juice essences were found to have both oil and aqueous phases and it has been determined that the oil phase portion of the essence can be harmed by being subjected to temperatures in excess of 160° F. Therefore, it was proposed the initial feed be heated to approximately 155° 1 F. and the flashes to 115° F., and that the resulting vapor be run up a film type vertical condenser for initial condensation and that the vapor portion exiting from the top of the film type condenser, which could be a tube type or a plate type, could be subsequently condensed to produce the essence.

Figure 2:
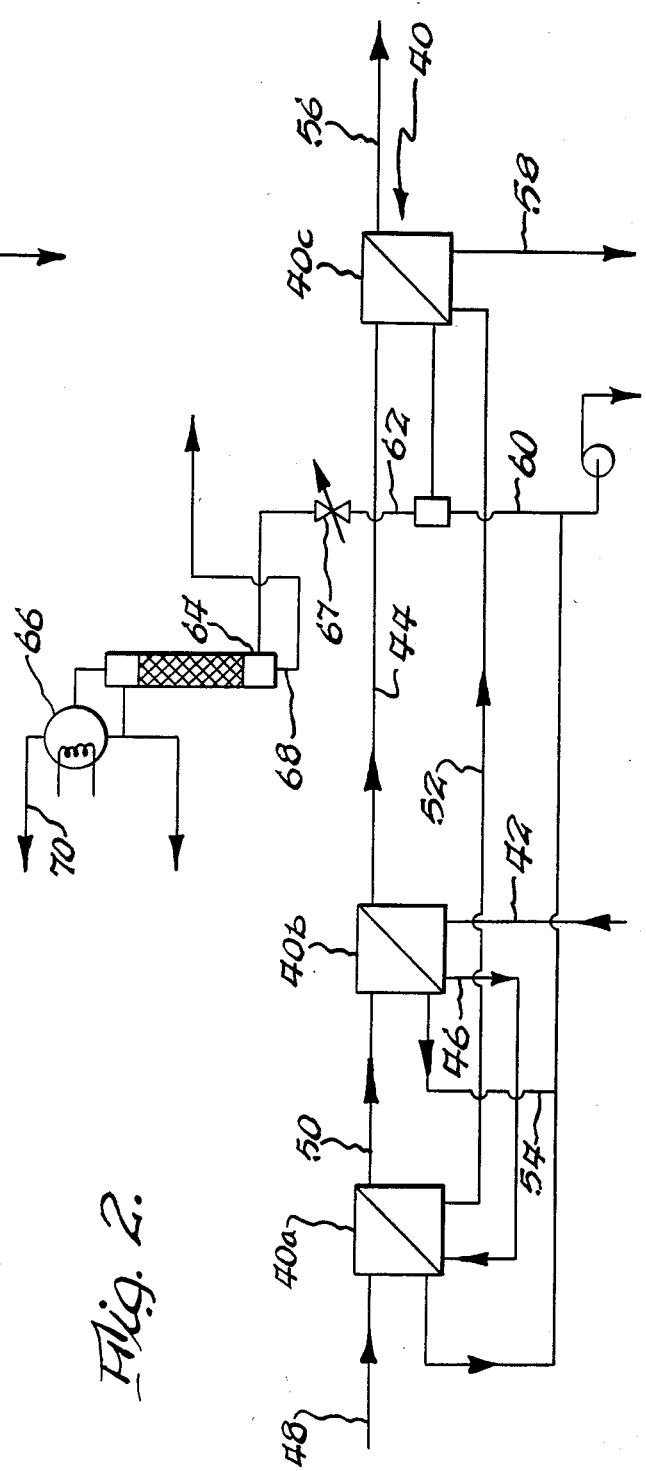
FIG. 2 also shows a prior art essence recovery system utilizing partial condensation.

While the Lake Alfred design was of interest, it was not practical to commericalize this design as proposed, as an excessive amount of energy was required to produce the essence bearing vapor. The commercialized form vaporizes the feed in a different manner and is generally referred to as the partial condensation process, an example being shown in FIG. 2. As illustrated in FIG. 2 a three effect evaporator is used, the evaporator being indicated generally at 40, the first, second and third effects being indicated at 40a, 40b, and 40c. As is well known in the art the operating temperatures of the various effects decrease and the boiling temperatures are modified by decreasing the pressure within the effects. In the example illustrated, the feed juice 42 is intially introduced into the second effect 40b where it is boiled at a medium temperature, for example, 150° F. A portion of the feed juice is vaporized forming the essence bearing vapor indicated at 44, and the balance or first concentrate 46 of the initial feed juice 42 is then passed into the feed or boiling side of the first effect 40a where it is heated by steam 48 to vaporize a further portion 50 thereby producing a second concentrate 52. The vaporized portion 50 is then used on the vapor side of the second effect to heat the second concentrate 52 to boil away the essence bearing vapor 44, the vaporized portion fully condensing to produce a waste condensate 54. The second concentrate 52 is then introduced to the feed or boiling side of the third effect 40c wherein it is heated by the essence bearing vapor 44 to boil off a further portion 56, which is discharged, producing the final concentrate 58. The essence bearing vapor 44 of the initial feed which is used in the vapor side of the third effect is partially condensed. The condensed portion is indicated at 60 and is essentially water, i.e., a waste condensate. The non-condensed portion 62 contains the essence, and this portion is then passed on to two condensers 64 and 66 which operate in series. In normal practice approximately 90% of the essence bearing vapor 44 will condense out, the exact proportion being controlled by downstream pressure and variable orifice in the form of valve 67. The first condenser 64 is utilized to condense out a further aqueous portion 68 of the vapor and the second condenser 66 is utilized to condense virtually all of the condensible vapors into the desired fold of essence bearing material. Non-condensed gases 70 are vented to a scrubber and may be processed in the manner shown in FIG. 1. The partial condensation process described is generally effective and produces a good quality essence. However, this system does not have the desired thermal energy efficiency characteristics required by today's industry.

Today multiple effect juice evaporators are in general, not capital effective with efficiencies higher than seven times steam input. The it is desirable that even greater efficiencies be attained in view of the constantly increasing cost of energy. Therefore, it has been proposed in the industry to concentrate juices by utilizing mechanical vapor recompression instead of multiple effect evaporators, or to use mechanical vapor recompression in conjunction with multiple effect evaporators. In mechanical vapor recompression the vapor boiled from the product on the feed or boiling side of an evaporator is passed to a compressor where its pressure is boosted, the compressed vapor (which has been heated due to its compression) then being returned as the heating medium to the vapor side of the evaporator. As the compressed (and heated) vapor condenses, it gives up its latent heat to boil away a portion of additional feed introduced to the feed side of the evaporator, the additional feed being at boiling temperature. The compressing step adds energy (in the form of excess heat) to the system which is not fully utilized in the boiling of the feed, and this excess energy is normally dissipated in the form of heated vapor from the vapor side of the evaporator. While there is some waste in such systems, mechanical vapor recompression evaporation still gives a high energy efficiency ranging from the equivalent of 25 effects upwards, depending upon plant arrangement.

In accordance with the principles of this invention the excess vapor which exits from the vapor side of the evaporator in a process using mechanical vapor recompression is condensed to form the recovered essence. This condensation can be done either directly, or after a further separation stage. The process of this invention can be utilized with mechanical vapor recompression associated with a single effect evaporator, as illustrated in FIG. 3. This figure sets forth the various system components in slightly greater detail than FIGS. 1 and 2. While steam is required to initiate the operation of a vapor recompression system, once a system has been initiated, no makeup steam is required as the proper energy levels are maintained by establishing the proper boost in the compressor. FIG. 3 will be described as a constantly running system, and thus, as illustrated, no steam is required. Thus, feed juice 80, which is at its boiling temperature, is introduced to the boiling side of a single effect evaporator 82. Compressed (and superheated)essence bearing vapor 84 is also introduced to the vapor side of the evaporator 82. As the feed juice and essence bearing vapor pass through the evaporator, the vapor will substantially condense giving up its latent heat to cause at least a portion of of the feed juice to vaporize, this vaporized faction (along with some concentrate) being discharged to a vapor/liquid separator 86. The separator 86 will in turn separate the liquid concentrate from the vapor, causing the liquid portion 88 to be discharged, the portion 88 subsequently being combined with the liquid portion 90 of the feed juice to form the stripped juice. The stripped juice could be roughly 90% or less of the initial volume of the feed juice if the juice were apple juice. In any event, the stripped juice 92 can be additionally processed in any manner desired. In the meantime, the separator 86 will discharge the essence bearing vapor 94 to a compressor 96, which compressor will be utilized to increase the pressure of the essence bearing vapor and thereby add heat energy to the essence bearing vapor causing it to become superheated. This energy is subsequently given up within the evaporator (thereby heating the incoming feed juice 80) causing a substantial portion of the essence bearing vapor to condense. In other words, the superheated vapor will be desuperheated in the evaporator sufficiently to recover up to substantially all of said essences. The condensate 98 is essentially water and can be discharged without loss of essence. The remaining excess vapor 100 is then passed into a condenser 102 which is cooled by a suitable cooling medium 104, the vapor 100 condensing thereby forming the essence material 106. In the process outlined above, if we assume that 25% of the juice is initially stripped and that subsequently 97% of the essence bearing vapor is condensed, a 133 fold essence recovery is obtained. It should also be noted that the system described above is highly energy efficient.

Referring now to FIG. 4 a similar system is illustrated in which the process of this invention is utilized with mechanical vapor recompression associated with an evaporator having first and second effects 120a, 120b, respectively. Heated feed juice 122 is introduced into the boiling side of the first effect evaporator 120a, and heated (and compressed) vapor 124 from the second effect evaporator 120b is introduced into the vapor side of the first effect 120a. (This vapor 124 is essentially not essence bearing.) As the feed juice 122 and vapor 124 pass through the first effect 120a the vapor 124 will give up its latent heat and condense out, the condensate indicated at 126 being used to preheat the incoming feed juice. In the meantime, the feed juice 122 will be stripped of its essence bearing vapors, which essence bearing vapors will be passed to the vapor/liquid separator 128. After separation the liquid portion 130 will be combined with the liquids 132 discharged from the first effect evaporator to form the first effect concentrate 134. This concentrate is then pumped by pump 136 into the boiling side of the second effect 120b. The essence bearing vapor 140 is discharged from the vapor/liquid separator 128 into the vapor side of the second effect evaporator, which essence bearing vapor 140 will subsequently substantially condense as it gives up its latent heat to further condense the feed juice. The liquid portion 142 of the condensed essence bearing vapor may be either discharged or utilized to preheat the incoming feed 122. The vapor portion 144 which does not condense is subsequently collected. In the meantime the incoming first effect concentrate is partially boiled away, the vapor portion passing into a second vapor liquid separator 146. After separation, the liquid portion 148 is combined with the non-boiled porton 150 discharged from the evaporator to form the desired concentrate 152. The strictly vapor portion 154 is then passed into a compressor 156 where its pressure (and temperature) are boosted, this material then becoming the compressed vapor 124 used in the first effect evaporator.

While the essence bearing vapor 144 may be condensed in the manner illustrated in FIG. 3, it can also be run through a distilling condenser to further enrich the final product. Thus, as shown in FIG. 4, the essence bearing vapor 144 can be introduced into a vertical distilling condenser 158. Within the vertical condenser 158 the essence bearing the water and vapor 144 will be partially condensed. The enriched vapor 160 will continue its upward flow to the overhead condenser 162, while the condensate 164 flows out of the base of the condenser and is discharged. The codensed vapor 166, which is discharged by condenser 162 can have a portion 168 (reflux portion) reintroduced into the condenser to further enrich the condensed essence portion 166. The final essence product 170 can then be collected. Non-condensed gases 172 are vented to a scrubber (not shown) for further processing, such as in the manner shown in FIG. 1.

It should be noted that in the process described with reference to FIG. 4 that all of the compressed vapor 124 is condensed out. This is possible because there are virtually no gases in the vapor 154, as nearly all of the gases in the initial feed juice 122 have been driven off in the first effect 12a. Thus the system can be balanced to utilize the excess energy produced by the compressor 156 to produce an outflow (at 144) of essence enriched vapors.

While the process of this invention has been described in conjunction with a single effect in FIG. 3 and with two effects in FIG. 4, this process could be utilized with more than two effects. If more than two effects are utilized, the vapors from the boiling side of the final effect, that is to say the downstream effect, will be compressed and returned to the vapor side of the initial upstream effect. The initial feed of fruit juice (or other material from which essences are to be recovered) can be introduced into the boiling side of either the initial upstream effect or any other upstream effect. If the initial feed is not fed to the initial upstream effect, the initial concentrate will then be fed to the boiling side of the initial upstream effect. The essence bearing vapors will be fed to the vapor side of the next downstream effect in any event.

It can be seen from the above that the essence recovery process of this invention has a higher energy efficiency than prior art systems.

What is claimed is:

1. In association with a method of concentrating fruit juices by evaporation, a continuous essence recovery process of high thermal efficiency comprising the following steps providing an excess of superheated vapor by vapor recompression and desuperheating sufficient to recover up to substantially all of said essences by:
  (a) mechanically compressing vapors boiled off from a feed of fruit juice to provide the total energy input for the ongoing process;
  (b) using the mechanically compressed vapors to boil away essence bearing vapors from an initial feed of fruit juice;
  (c) partially condensing the essence bearing vapors in the vapor side of an evaporator, the excess heat produced by the compressing step producing an outflow of essence enriched vapors; and
  (d) a condensing the essence enriched vapors to recover the essence.

2. An essence recovery process of high thermal efficiency in association with a continuous process for concentrating fruit juices by evaporation comprising the following steps providing an excess of superheated vapor by vapor recompression and desuperheating sufficient to recover up to substantially all of said essences by:
  (a) compressing vapors to provide the total energy input to the continuous process; and
  (b) utilizing the compressed vapors on the vapor side of evaporator means to heat fruit juices on the boiling side of the evaporator means to produce essence bearing vapors and a concentrate, the essence bearing vapors only being partially condensed in the vapor side of an evaporator whereby the excess heat produced by the compressing step produces an outflow of essence enriched vapors.

3. An essence recovery process of high thermal efficiency in association with a continuous process for concentrating fruit juices by evaporation comprising the following steps providing an excess of superheated vapor by vapor recompression and desuperheating sufficient to recover up to substantially all of said essences by:
  (a) providing an evaporator having a vapor side in which a heating medium is introduced and a boiling side in which the fluid to be evaporated is introduced,
  (b) introducing a feed juice into the boiling side of the evaporator,
  (c) withdrawing a juice concentrate and uncompressed essence bearing vapors from the boiling side of the evaporator,
  (d) compressing the withdrawn essence bearing vapors,
  introducing the compressed essence bearing vapors on the vapor side of the evaporator to heat the feed juice to produce the juice concentrate and uncompressed essence bearing vapors, substantially all of the water vapor within the essence bearing vapor on the vapor side of the evaporator condensing out as it heats the feed juice to produce a waste condensate, the excess heat produced by the compressing step producing highly enriched essence bearing vapors.

4. An essence recovery process in association with a continuous process for concentrating fruit juices by evaporation comprising the following steps providing an excess of superheated vapor by vapor recompression and desuperheating sufficient to recover up to substantially all of said essences by:
  (a) providing an evaporator having first and second effects, the second effect being downstream of the first effect and each effect having a vapor side in which a heating medium is introduced and a boiling side in which the feed to be evaporated is introduced;
  (b) withdrawing water vapor from the boiling side of the second effect and compressing it to provide the total continuous energy requirements of the process of concentrating fruit juices;
  (c) introducing a feed juice into the boiling side of the first effect;
  (d) introducing the compressed water vapor withdrawn from the boiling side of the second effect into the vapor side of the first effect to produce an initial concentrate of the feed juice by boiling off the essences and a portion of the water in the feed juice to form essence bearing vapors;
  (e) withdrawing the initial concentrate from the first effect and introducing it into the boiling side of the second effect for subsequent partial evaporation;
  (f) withdrawing the essence bearing vapors from the boiling side of the first effect and introducing it into the vapor side of the second effect to produce a further concentrate of feed juices by boiling off water vapor, a substantial portion of the water in the essence bearing vapors condensing as it heats the initial concentrate, the excess heat produced by the compressing step producing an outflow of essence enriched vapors which may be subsequently condensed; and
  (g) withdrawing and condensing the highly essence enriched vapors from the vapor side of the second effect.

5. The essence recovery process as set forth in claim 4 in which the essence enriched vapors withdrawn from the vapor side of the second effect are run through a distillation column to further enrich the final product.

6. An essence recovery process in association with a continuous process for concentrating fruit juices by evaporation comprising the following steps providing an excess of superheated vapor by vapor recompression and desuperheating sufficient to recover up to substantially all of said essences by:
  (a) providing an evaporator having two or more effects, one or more effects being upstream of a downstream effect and each effect having a vapor side in which a heating medium is introduced and a boiling side in which fruit juice to be evaporated is introduced;
  (b) withdrawing water vapor from the boiling side of the downstream effect, compressing it, and introducing the compressed water vapor into the vapor side of an upstream effect, the compressing providing the total continuous energy requirements of the continuous process of concentrating fruit juices;
  (c) feeding the fruit juice to be processed into the boiling side of an upstream effect, essences and a portion of the water in the fruit juice being boiled off to form essence bearing vapors and an initial partial concentrate of the fruit juice;
  (d) withdrawing the initial concentrate and introducing it into the boiling side of another effect for subsequent partial evaporation;
  (e) withdrawing the essence bearing vapors and introducing it into the vapor side of another effect to produce a further concentrate of fruit juices by boiling off water vapor, a substantial portion of the water in the essence bearing vapors condensing as it heats partially condensed fruit juices, the excess heat produced by the compressing step producing an excess of essence enriched vapors which may be subsequently condensed; and
  (f) withdrawing and condensing the essence enriched vapors from the vapor side of said last mentioned another effect.

* * * * *